A. A. CONNOLLY.
COPIES FOR TEACHING PENMANSHIP.
No. 172,971. Patented Feb. 1, 1876.
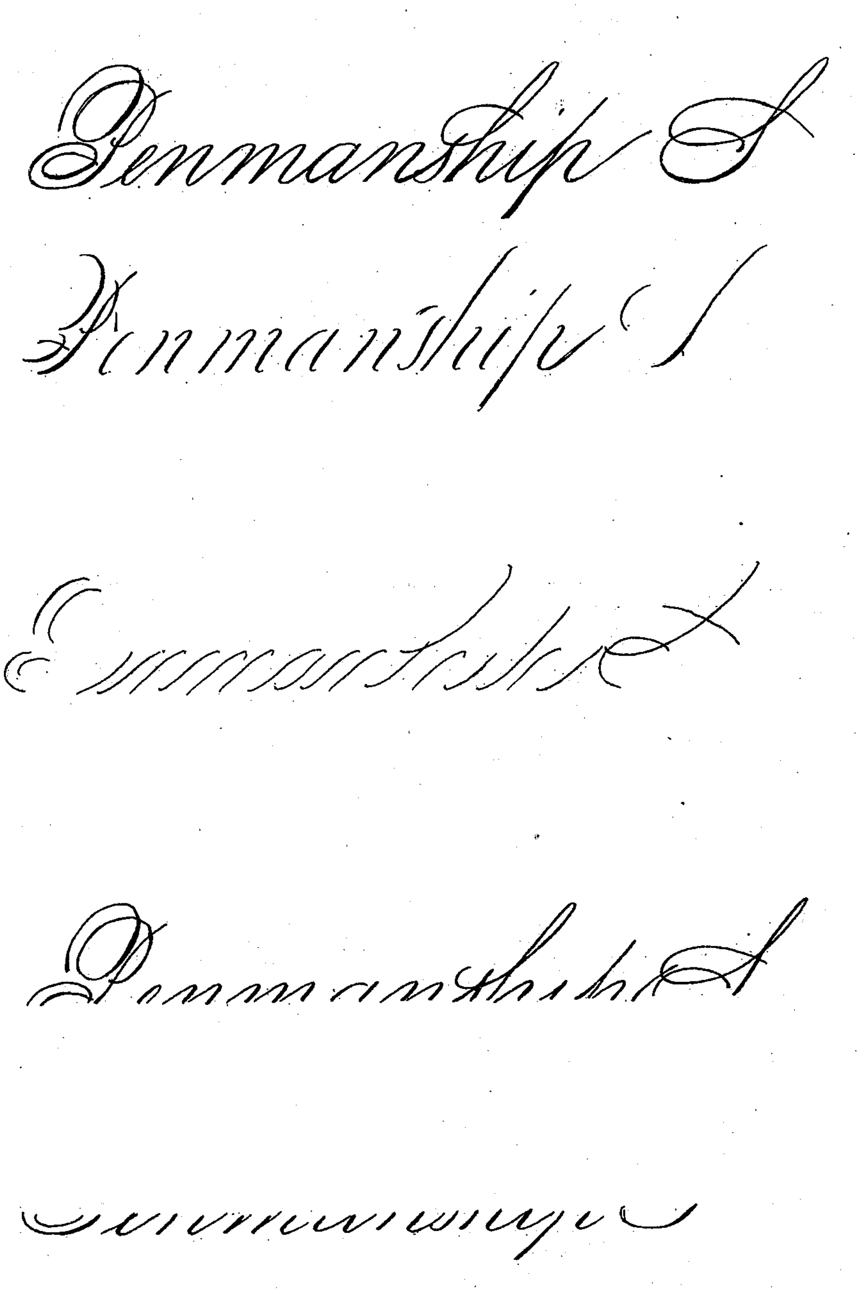
Witnesses
Jos. P. Connolly
M. F. Halleck
Inventor
Anthony A. Connolly
By Connolly Bros. Attorneys
N. PETERS, PHOTO-LITHOGRAPHER, WASHINGTON, D. C.

UNITED STATES PATENT OFFICE.

ANTHONY A. CONNOLLY, OF WASHINGTON, DISTRICT OF COLUMBIA.

IMPROVEMENT IN COPIES FOR TEACHING PENMANSHIP.

Specification forming part of Letters Patent No. 172,971, dated February 1, 1876; application filed January 8, 1876.

*To all whom it may concern:*

Be it known that I, ANTHONY A. CONNOLLY, of Washington, in the county of Washington and District of Columbia, have invented a certain new and useful Improvement in Copy-Books; and I do hereby declare the following to be a full, clear, and exact description of the invention, such as will enable others skilled in the art to which it pertains to make and use it, reference being had to the accompanying drawings, which form part of this specification.

The object of this invention is to facilitate the acquirement of a rapid, systematic, and graceful handwriting, by the education of the mind to a knowledge and just appreciation of the graceful forms and proportions of chirography, and through the practice, according to a rational system, of the eye and hand in the reproduction of suitable models of penmanship.

It is well known that in the acquirement of the art of writing under any system of penmanship great difficulty is experienced in applying the rules upon which the system is based to the formation of perfect characters, first, on account of the inability of the pupil to appreciate the niceties of form and proportion; and, secondly, on account of the lack of the necessary mechanical skill to produce even that which is comprehended.

Rules require models to illustrate their application; but in the reproduction of the latter the rules are usually either forgotten or ignored in the tedious effort to make a fac-simile of the model under the misleading guidance of the uneducated eye. Even where the eye retains and conveys a true impression, it is next to impossible to follow with the pen all the characteristics of the model; hence, both rules and models become ineffective, except to a very limited extent.

That there are so many bad writers, even among those whose habits and occupation lead to a frequent use of the pen, is unmistakeably one of the evils of early training, or rather lack of training, and not the result of physical or mental defects. The technicalities of penmanship are few and simple, and it is certainly unreasonable that, of the years of tedious practice usually spent, the result is an overwhelming proportion of scrawlers, whose illegible scratches are a disgrace to the modern system of education.

That there must be rules as well as models is conceded; but, according to my improvement, the advantages of both are sought to be obtained by the provision of means whereby, from the very beginning, the pupil of any system of penmanship is actually compelled to adhere to all its rules, and to follow unerringly all its models.

My improvement, then, consists in the provision of a series of charts, copy-pages, or other devices, in the ordinary progressive order and arrangement of the Spencerian or other system of copy-books having copper-plate head-lines.

In addition to the head-lines I print upon each line, or at intervals below where the head-line is to be reproduced, certain portions of the latter—that is, of each of the characters; for instance, all the "down-strokes," or all the "up-strokes," or all the upper or lower portions, leaving the unprinted portions to be filled in by the pen.

Now, the pupil at the outset, instead of having to copy the entire letter or all of the character—a task seldom acceptably accomplished, and never by one so unskilled as to require the guidance of a copy-book—has only to supply such portions as lie within his ability to produce correctly, having at the point of his pen unerring guides for the proportions, angles, &c., and at the top of the page a complete model for the purposes of verification.

It will be seen at once that, while the pupil is compelled to copy correctly and to adhere strictly to the rules, he is not reduced to a mere tracer, but has to exercise judgment and skill, through which self-reliance the system is rendered beneficial in educating him to a knowledge of complete forms, and impressing upon his mind their essential characteristics, at the same time allowing him manual practice while relieving him of all unnecessary and injurious labor.

The accompanying illustrations sufficiently indicate the principle involved. The details of the system may be left to the judgment of experienced teachers; but it is thought that it may be made most advantageously progressive by so arranging the exercises that the pupil shall at first form only the simplest portions of the letters, the more difficult curves and outlines to be left for future exercises, according as his skill improves.

It is obvious that this system is available for the purposes of instruction in drawing.

I claim—

A copy-book, leaf, or chart for instruction in penmanship, having a head line or lines of the chirographic models to be copied, and having below the head-line a series of lines of incomplete engraved or printed characters, representing actual disconnected fractional portions of the characters in the head-line, with intervening blank spaces, to be filled in by the pupil, substantially as described and shown.

In testimony that I claim the foregoing I have hereunto set my hand this 8th day of January, 1876.

ANTHONY A. CONNOLLY.

Witnesses:
MARTIN CONNOLLY,
THOS. A. CONNOLLY.